United States Patent [19]

Marx

[11] 3,904,004

[45] Sept. 9, 1975

[54] OVERRUNNING CLUTCH

[75] Inventor: Anton Marx, Sulzthal, Germany

[73] Assignee: SKF Industrial Trading and Development Company B.V., Amsterdam, Netherlands

[22] Filed: Feb. 5, 1974

[21] Appl. No.: 439,705

[30] Foreign Application Priority Data

Feb. 8, 1973 Germany............ 2306188

[52] U.S. Cl............ 192/41 R; 192/94; 192/113 B
[51] Int. Cl.² .............. F16D 41/00; F16D 69/00
[58] Field of Search ..... 192/41 R, 65, 70, 94, 89 H, 192/113 B, 107 R; 188/82.9

[56] References Cited
UNITED STATES PATENTS

| | | | |
|---|---|---|---|
| 852,587 | 5/1907 | Towler............... | 192/41 R |
| 2,516,544 | 7/1950 | Breeze................ | 192/113 B |
| 2,675,898 | 4/1954 | Morgan............... | 192/41 R |
| 2,873,833 | 2/1959 | Hogan................ | 192/41 R |
| 3,025,686 | 3/1962 | Lewis................. | 192/113 B X |
| 3,463,281 | 8/1969 | Aschauer............ | 192/113 B X |

*Primary Examiner*—Allan D. Herrmann

[57] ABSTRACT

A freewheeling overrunning clutch having a rotatable outer member and a relatively rotatable inner member provided with conforming surfaces adapted to frictionally engage. The members are biased by spring means into normal engagement. One of the engaging surfaces is provided with grooves forming fluid reservoirs. The fluid increasing in pressure on increase in the relative rotation between the members to force the surfaces apart.

10 Claims, 2 Drawing Figures

OVERRUNNING CLUTCH

BACKGROUND OF THE INVENTION

The present invention relates to an automatic freewheeling or overrunning clutch.

In general such clutches comprise a rotatable outer ring forming a housing and a rotatable inner ring adapted to be secured to a shaft or the like. In the forms of construction of known freewheeling systems it has been customary to arrange clamping bodies or similar means between opposite surfaces of the inner and outer ring so that a non-positive connection can be established between them on relative rotation in one direction only, and which permits the rings to disengage and rotate freely with respect to each other on relative rotation in the opposite direction giving rise to the overrunning function.

A disadvantage of these systems arises from the fact that the use of clamping bodies limits the speed and strength of engagement as well as defining the degree of freewheeling or overrunning. The effects of centrifugal forces on the clamping bodies during the overrunning function also create excessive frictional forces causing excessive wear and early breakdown.

It is an object of the present invention to provide a free-wheeling or overrunning clutch which overcomes the disadvantages and drawbacks of the prior art devices.

It is another object of the present invention to provide a freewheeling or overrunning clutch which in the engaged condition transmits relatively great torque without breakdown so that high speeds may be obtained.

It is a further object of the present invention to provide a freewheeling or overrunning clutch which in the disengaged condition produces little friction and wear allowing further operation at high speeds.

It is another object of the present invention to provide a freewheeling or overrunning clutch having no clamping bodies subject to wear or breakdown.

The foregoing objects, others as well as numerous other advantages will be seen from the following disclosure of the present invention.

SUMMARY OF THE PRESENT INVENTION

According to the present invention, a freewheeling or overrunning clutch of the type described is provided wherein one of the opposite surfaces of the rings rotating relatively to one another are provided with shallow, pressure-building grooves. The grooves in the surfaces which are preferably inclined in relation to the normal to the axis are advantageously designed as spiral grooves.

The present invention makes use of the fact that between the surfaces of two relatively rotating rings, one of which is provided with spiral grooves or other pressure-building grooves, an automatic pressure build-up is generated, even at a minimum relative speed of rotation in a determined direction of rotation. This pressure in the medium which may be air, oil, etc. between the two surfaces causes their separation and thus permits the inner and outer rings to rotate freely. This creates a wearfree guideway with low loss of power. In the case of relative rotation close to zero or in the opposite direction, no pressure build-up takes place and therefore no separation of the two surfaces is effected; a circumstance utilized for the clutch effect.

To improve the clutch effect, according to a further characteristic of the present invention, the inner ring is formed in two parts. The two halves are normally biased by spring devices in the direction of the opposing surface of the housing ring, the bias being only overcome by the force created by the pressure medium.

In a further development of the invention, the inner ring is carried by means of a single or multiple threaded screw, ball or roller spindle on the shaft or a hub attached thereto. The spindle serves simultaneously for the automatic production of the compressive force that is needed for transmitting the torque from a driving shaft to the outer ring. In lieu of the spindle the inner ring can also be mounted on the shaft by rows of balls arranged spirally in relation to the axis of the clutch.

The present invention may be used in barring gear and nonreturn locks as well as overrunning clutches. An example of this latter use is as the connection between the starting turbine or rotor for a gas turbine initiating rotation of the turbine up to a determined overrunning speed of rotation (starting phase). In this situation there is created a non-positive connection between the shaft and the outer ring secured to the turbine (Clutch operation). After reaching the overrunning speed, which is higher than the driving speed, the rings are separated from the housing ring (freewheeling operation) through the automatic pressure build-up between the opposite surfaces.

Full details of the present invention are given in the following description of the preferred embodiments as well as being shown in the accompanying drawings.

DESCRIPTION OF THE INVENTION

Figure 1:
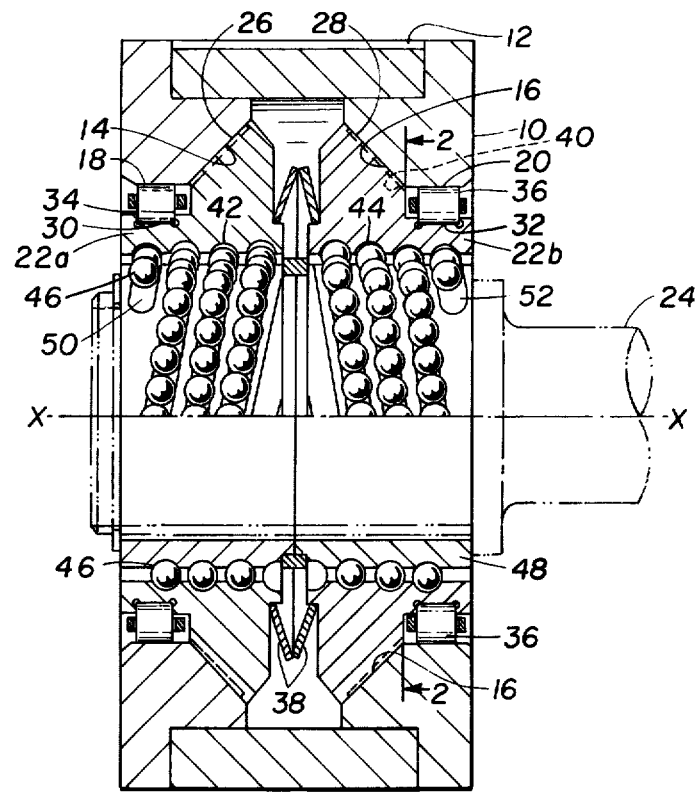
FIG. 1 is a longitudinal section through an overrunning clutch according to the invention.

As seen in the drawings, the exemplified overrunning or freewheeling clutch comprises an outer member 10 preferably annular, forming a housing ring or the like capable of connection to a rotary member. The outer surface of the outer member 10 shown, is adapted to be inserted in the bore of a driven machine or turbine member, and is provided with an axial grooved keyway 12 into which a suitable key or other fastener may be inserted. If desired, the outer member 10 may be made as an integral component of a gear, wheel, or similar member.

The inner bore of the outer member is provided with a pair of substantially flat surfaces 14 and 16 inclined opposite to each other outwardly at an angle to the plane perpendicular to the central axis or axis of rotation of the device indicated by the line $x-x$. The surfaces 14 and 16 terminate in a cylindrical bore 18 and 20 respectively, at each end of the clutch.

An inner member 22 substantially annular in shape, is located within the outer member 10 so as to be connected with a driving shaft 24 depicted in dot-dash lines. The inner member is formed with generally flat surfaces 26 and 28 conforming to the inclined surfaces 14 and 16 respectively of the outer member, and which are biased into normal engagement therewith. To effect this, the inner member 22 is preferably formed of two halves a and b being mirror images of each other. In addition to the inclined surfaces 26 and 28 the inner member halves are provided with cylindrical race surfaces 30 and 32 opposite the axially extending cylindrical surfaces 18 and 20 of the outer member. A radial loose roller bearing 34 and 36 is arranged between the opposite cylindrical surfaces 18, 30 and 20, 32 respectively, in order to rotatively support and locate the inner member 22 concentrically within the outer member 10. Each of the inner frontal faces of the halves of the inner member is provided with a step on which seats a spring 38 such as a belleville type spring formed of opposing disk-shape disks. The spring 38 may be another conventional compression type spring, if desired. The spring 38 acts to normally bias the inner halves apart so that their inclined faces 26 and 28 normally frictionally engage the corresponding surfaces 14 and 16 of the outer member 10.

Figure 2:
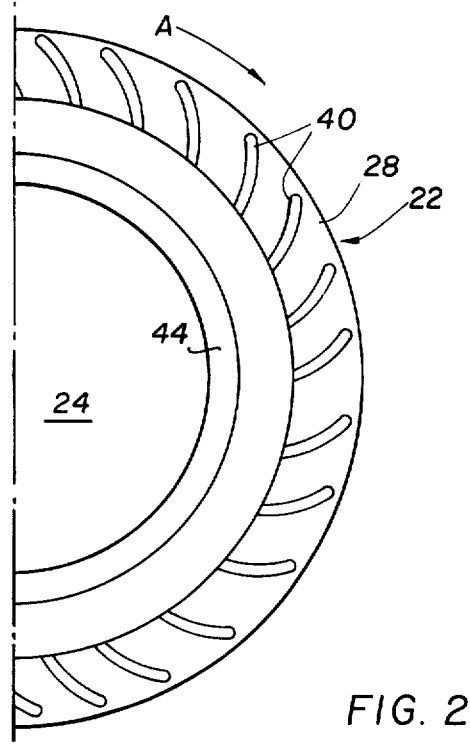
FIG. 2 a view of the inner ring in the direction 2—2, with the housing ring omitted.

Each of the inclined surfaces 26 and 28, as seen in detail in FIG. 2, is provided with a plurality of grooves 40 uniformly distributed about the central axis. The grooves 40 are preferably shallow extending slightly below the surface plane. They are also arcuate in shape, preferably in the form of a spiral flaring outwardly from the center being generated generally opposite to the normal direction of rotation indicated by arrow A. The grooves 40 form pockets or reservoirs for the retention of a fluid media, such as air, oil, or other lubricating media, which might be conventionally chosen; while the grooves 40 are seen in the illustrated embodiment as being formed on the surfaces of the inner member, they may instead be formed on the corresponding surfaces of the outer member, if desired.

The inner member 22 (or its symmetrical halves) is provided with a cylindrical bore in which a pair of spiral grooves 42 and 44 are formed (one for each half), in which are located a plurality of ball bearings 46. The spiral grooves 42 and 44 are inclined opposite to each other, with respect to the central axis $x-x$ to form an arrangement simulating an arrow the tip of which points toward the center of the inner member 22, in the direction of normal rotation of the clutch, indicated by the directional arrow A. Preferably, a sleeve or hub 48 is interposed between the ball bearings 46 and the driving shaft 24 (being keyed or fastened to the shaft) although the balls may directly engage the shaft if desired. In either event, the hub 48 or shaft 24 is provided with a pair of spiral grooves 50 and 52 conforming to and corresponding in location to the grooves 42 and 44 formed in the inner member 22.

This arrangement of ball bearings and grooves, provides a very effective roller spindle or spindle drive between the shaft 24 and the inner clutch member, when both rotate in the direction of the arrow A, effectively transmitting full torque from the shaft to the clutch. Other conventional spindle drives may also be used.

The bearings 30 and 32 receive and absorb radial forces acting from the outside of the clutch, on the outer member, or from the inside of the clutch on the shaft 24. The ball bearing absorb the compressive forces acting on each one of the halves of the inner member as well as simultaneously transmitting the torque created during clutch engagement. The arrangement as a whole, is seen to be symmetrical about the axis of rotation as well as to either side of a plane perpendicular to the central axis running through the axial center indicated by the abutting surfaces of the belleville spring members.

Clutch engagement is obtained by the abutment of the inclined surfaces 14, 26 and 16, 28 during relative rotation of the outer member 10 and the inner member 22. Disengagement of these surfaces occurs when the outer member 10 runs at a predetermined relative speed greater than that of the inner member; when this occurs the fluid media located within the shallow grooves 40 increases in pressure, creating a hydrodynamic effect acting against the bias of spring 38 to separate the two halves from contact with the outer member, and creating a fluid bearing film between the opposed inclined surfaces, allowing the outer member to run freely about the inner member. By selecting the shape, size and number of grooves 40, the fluid media, the strength of the spring, and other parameters, the disengagement of the clutch can be obtained at any desired and predetermined relative speed.

The operation of the overrunning clutch described is explained below by the example of use in starting or cranking a gas turbine.

Assuming that the hub 48 is connected with the shaft 24 of a starting motor and the outer ring 10 to the gas turbine to be started. In the stationary state, as shown in FIG. 1, the two halves of the inner ring 22 are forced apart axially by the spring components 38, so that a frictional engagement obtains between the inner ring 22 and the outer ring 10. At the beginning of the starting phase, the starting motor now rotates the hub 24, which through the two ball spindles causes the bipartite inner ring 22a and 22b to rotate. The frictional drive is intensified automatically through the spindle system unitl torque equalization obtains between the inner and outer members. Due to the non-positive connection between the inner ring and outer ring 10, the latter also rotates and thus drives the gas turbine. On reaching a predetermined overrunning speed of rotation, the gas turbine that has now been cranked, begins to revolve faster than the starting motor, so that the outer ring 10 revolves faster than the inner ring 22.

Through the relative speed of rotation between the opposite surfaces of the inner ring 22 and the outer ring 10, the torque to be transmitted decreases to zero (0) and there is automatically built up in the spiral grooves 40 of the inner ring 22 a pressure which separates the surfaces from one another when its axial component is greater than the axial force of the spring components 38. Through this operation there is built up between the surfaces of the inner ring 22 and the outer ring 10, which were previously connected non-positively with one another a hydrodynamic lubricating film so that freewheeling operation is established.

Through the build-up of a hydrodynamic lubricating film between the inner ring 22 and the outer ring 10 in freewheeling operation, the outer ring 10 is carried axially so as to be free from wear. Radial support is ensured by the two loose bearings 30, 32.

The freewheeling and overrunning clutch that has been described is suitable in particular when the ratio between running speed and overrunning speed is high because, as already stated, traditional freewheeling systems do not meet the desired requirements in relation to low wear and freedom from breakdown at these speeds.

If the shift speed is not too high, the principle according to the invention is also suitable for barring gear and non-return locks. In the latter case, (in some instances with rotation in the engaged direction) the adhesion, brought about by the mass inertia of the two-part inner ring 22 and intensified by the spindle system, between the inner ring 22 and the outer ring 10 is sufficient to transmit a predetermined torque, so that the spring components 38 can be dispensed with. On the reversal of the direction of relative rotation (freewheeling operation) there is then built up between the opposite surfaces of the inner ring 22 and the outer ring 10, a hydrodynamic film of lubricant which separates the two surfaces from one another.

Various modifications and changes have been described, others will be obvious to those skilled in this art. Accordingly it is intended that the present disclosure be taken as illustrative only of the invention and not as limiting of its scope.

What is claimed:

1. An overrunning clutch comprising a rotatable outer member, a rotatable inner member and roller bearing means interposed therebetween, each of said inner and outer members having annular opposing frictionally engaging surfaces, resilient means normally biasing said members toward each other, a plurality of grooves formed in the annular surface of one of said members for retaining a fluid media, said media increasing in pressure on relative rotation of said members to create a fluid force between said opposing surfaces acting opposite to said resilient means, thereby to disengage said opposing surfaces.

2. The clutch according to claim 1 wherein said engaging annular surfaces are inclined with respect to a plane perpendicular to the axis of rotation.

3. The clutch according to claim 2 wherein said inner member is formed of two axial sections and said resilient means is located therebetween.

4. The clutch according to claim 1 wherein said inner member comprises a ring adapted to be mounted on a shaft including a roller spindle interposed therebetween.

5. The clutch according to claim 4 wherein said roller spindle comprises a plurality of ball bearings arranged in a spiral groove formed in the opposing surfaces of said inner ring and said shaft.

6. The clutch according to claim 4 wherein said roller spindle comprises a pluarlity of ball bearings arranged in a pair of spiral grooves formed in the opposing surfaces of said inner ring and said shaft, said spiral grooves being inclined in relation to the axis of rotation in opposite directions.

7. The clutch according to claim 4 including a sleeve interposed between said shaft and said roller spindle.

8. The clutch according to claim 7 wherein said roller spindle comprises a plurality of ball bearings arranged in a spiral groove formed in the opposing surfaces of said inner ring and said sleeve.

9. The clutch according to claim 7 wherein said roller spindle comprises a plurality of ball bearings arranged in a pair of spiral grooves formed in the opposing surfaces of said inner ring and said sleeve, said spiral grooves being inclined in relation to the axis of rotation in opposite directions.

10. The clutch according to claim 1 wherein said grooves are shallow and extend spirally from the central axis of said clutch, uniformly thereabout.

* * * * *